(12) United States Patent

Futa et al.

(10) Patent No.: US 9,441,598 B2
(45) Date of Patent: Sep. 13, 2016

(54) AIRCRAFT FUEL FILTER IMPENDING AND ACTUAL BYPASS INDICATION SYSTEM

(71) Applicant: HONEYWELL INTERNATIONAL INC., Morristown, NJ (US)

(72) Inventors: Paul W. Futa, North Liberty, IN (US); Gregory Kline, South Bend, IN (US); Eric Hechtl, Niles, MI (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 218 days.

(21) Appl. No.: 14/075,418

(22) Filed: Nov. 8, 2013

(65) Prior Publication Data

US 2015/0128906 A1    May 14, 2015

(51) Int. Cl.
| | | |
|---|---|---|
| *B01D 27/10* | (2006.01) | |
| *B01D 35/147* | (2006.01) | |
| *F02M 69/04* | (2006.01) | |
| *B01D 46/00* | (2006.01) | |
| *F02C 7/232* | (2006.01) | |
| *F02M 37/22* | (2006.01) | |

(52) U.S. Cl.
CPC ............ *F02M 69/04* (2013.01); *B01D 27/103* (2013.01); *B01D 35/147* (2013.01); *B01D 46/0087* (2013.01); *F02C 7/232* (2013.01); *F02M 37/22* (2013.01)

(58) Field of Classification Search
CPC .... F02M 19/066; F02M 69/04; F02M 37/22; F02M 2037/226; B01D 27/103; B01D 35/147; B01D 46/0087
See application file for complete search history.

(56) References Cited

U.S. PATENT DOCUMENTS

| | | | |
|---|---|---|---|
| 4,932,205 A * | 6/1990 | Alderfer et al. ........... 60/39.091 |
| 5,121,599 A | 6/1992 | Snyder et al. | |
| 6,996,970 B2 | 2/2006 | Lorenz | |
| 7,540,141 B2 | 6/2009 | Goldberg et al. | |
| 7,726,951 B2 | 6/2010 | Jansen et al. | |
| 8,234,874 B2 | 8/2012 | Upadhyay et al. | |
| 8,292,978 B2 | 10/2012 | Krahl | |
| 2005/0066649 A1* | 3/2005 | Lorenz ........................ 60/39.281 |
| 2009/0194485 A1 | 8/2009 | Colotte et al. | |
| 2012/0074069 A1 | 3/2012 | Ripley et al. | |
| 2012/0111011 A1 | 5/2012 | Pike | |

FOREIGN PATENT DOCUMENTS

| | | |
|---|---|---|
| CN | 101526020 A | 9/2009 |
| KR | 19970044221 A | 7/1997 |
| KR | 19980020763 A | 6/1998 |
| RU | 113539 U1 | 2/2012 |

* cited by examiner

*Primary Examiner* — Lindsay Low
*Assistant Examiner* — Jacob Amick
(74) *Attorney, Agent, or Firm* — Lorenz & Kopf, LLP

(57) ABSTRACT

A fuel supply system includes a fuel supply line, a fuel filter, a filter bypass line, a first differential pressure sensor, a second differential pressure sensor, and a filter bypass valve. The fuel filter is disposed in series in the fuel supply line to remove particulate from the fuel. The filter bypass line has a fuel inlet upstream of the fuel filter, and an outlet that is downstream of the fuel filter. The first differential pressure sensor continuously senses differential pressure across the fuel filter, and the second differential pressure sensor selectively senses differential pressure across the fuel filter. The filter bypass valve is movable between a first non-bypassing position and a second bypassing position and controls whether only the first differential pressure sensor or both the first and second differential pressure sensors sense the differential pressure across the fuel filter.

14 Claims, 2 Drawing Sheets

AIRCRAFT FUEL FILTER IMPENDING AND ACTUAL BYPASS INDICATION SYSTEM

TECHNICAL FIELD

The present invention generally relates to aircraft fuel supply systems, and more particularly relates to an aircraft fuel filter impending and actual bypass indication system for use in an aircraft fuel supply system.

BACKGROUND

Various fuel-burning engines, such as aircraft gas turbine engines, are typically supplied with fuel from a fuel supply system. A typical fuel supply system includes one or more pumps that draw fuel from a fuel reservoir, and increase the pressure of the fuel. The fuel is then delivered, via an appropriate piping circuit, to the engine. Over time, particulate or other debris may contaminate the fuel. Such contamination can lead to degraded engine performance and significant aircraft maintenance activities. Thus, many fuel supply systems also include one or more filters to remove particulate or other debris from the fuel.

As may be readily understood, the particulate or other debris that a fuel filter removes may also cause the fuel filter to clog. Thus, most fuel supply systems provide a way to bypass the fuel filter, if needed, in the event of a clog. This ensures fuel flow is not interrupted. Presently known systems and methods for bypassing the fuel filter, while generally safe and reliable, may exhibit drawbacks. For example, these systems and methods can be relatively complex, costly, and heavy.

Hence, there is a need for a fuel supply system that includes a relatively simple architecture for bypassing the fuel filter and that provides cost, weight, and/or packaging benefits. The present invention addresses at least this need.

BRIEF SUMMARY

In one embodiment, a fuel supply system includes a fuel supply line, a fuel filter, a filter bypass line, a first differential pressure sensor, a second differential pressure sensor, and a filter bypass valve. The fuel supply line is adapted to receive fuel from a fuel pump and direct the received fuel to one or more fuel loads. The fuel filter is disposed in series in the fuel supply line and is configured to remove particulate from the fuel supplied to the fuel supply line. The filter bypass line has a bypass line fuel inlet and a bypass line fuel outlet. The bypass line fuel inlet is coupled to the fuel supply line upstream of the fuel filter, and the bypass line fuel outlet is coupled to the fuel supply line downstream of the fuel filter. The first differential pressure sensor is configured to continuously sense differential pressure across the fuel filter, and the second differential pressure sensor is configured to selectively sense differential pressure across the fuel filter. The filter bypass valve is coupled to the filter bypass line and is movable between a first position, in which only the first differential pressure sensor senses differential pressure across the fuel filter, and a second position, in which the first differential pressure sensor and the second differential pressure sensor both sense differential pressure across the fuel filter.

In another embodiment, a fuel supply system includes a fuel pump, a fuel supply line, a fuel filter, a filter bypass line, a first differential pressure sensor, a second differential pressure sensor, and a filter bypass valve. The fuel pump has at least a pump inlet and a pump outlet. The pump inlet is adapted to couple to a fuel source. The fuel pump is adapted to receive a drive torque and is configured, upon receipt of the drive torque, to draw fuel from the fuel source into the pump inlet and discharge fuel from the pump outlet. The fuel supply line is coupled to the pump outlet to receive fuel discharged therefrom and direct the received fuel to one or more fuel loads. The fuel filter is disposed in series in the fuel supply line and is configured to remove particulate from the fuel supplied to the fuel supply line. The filter bypass line has a bypass line fuel inlet and a bypass line fuel outlet. The bypass line fuel inlet is coupled to the fuel supply line upstream of the fuel filter, and the bypass line fuel outlet is coupled to the fuel supply line downstream of the fuel filter. The first differential pressure sensor is configured to continuously sense differential pressure across the fuel filter, and the second differential pressure sensor is configured to selectively sense differential pressure across the fuel filter. The filter bypass valve is coupled to the filter bypass line and is movable between a first position, in which only the first differential pressure sensor senses differential pressure across the fuel filter, and a second position, in which the first differential pressure sensor and the second differential pressure sensor both sense differential pressure across the fuel filter.

Furthermore, other desirable features and characteristics of the system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
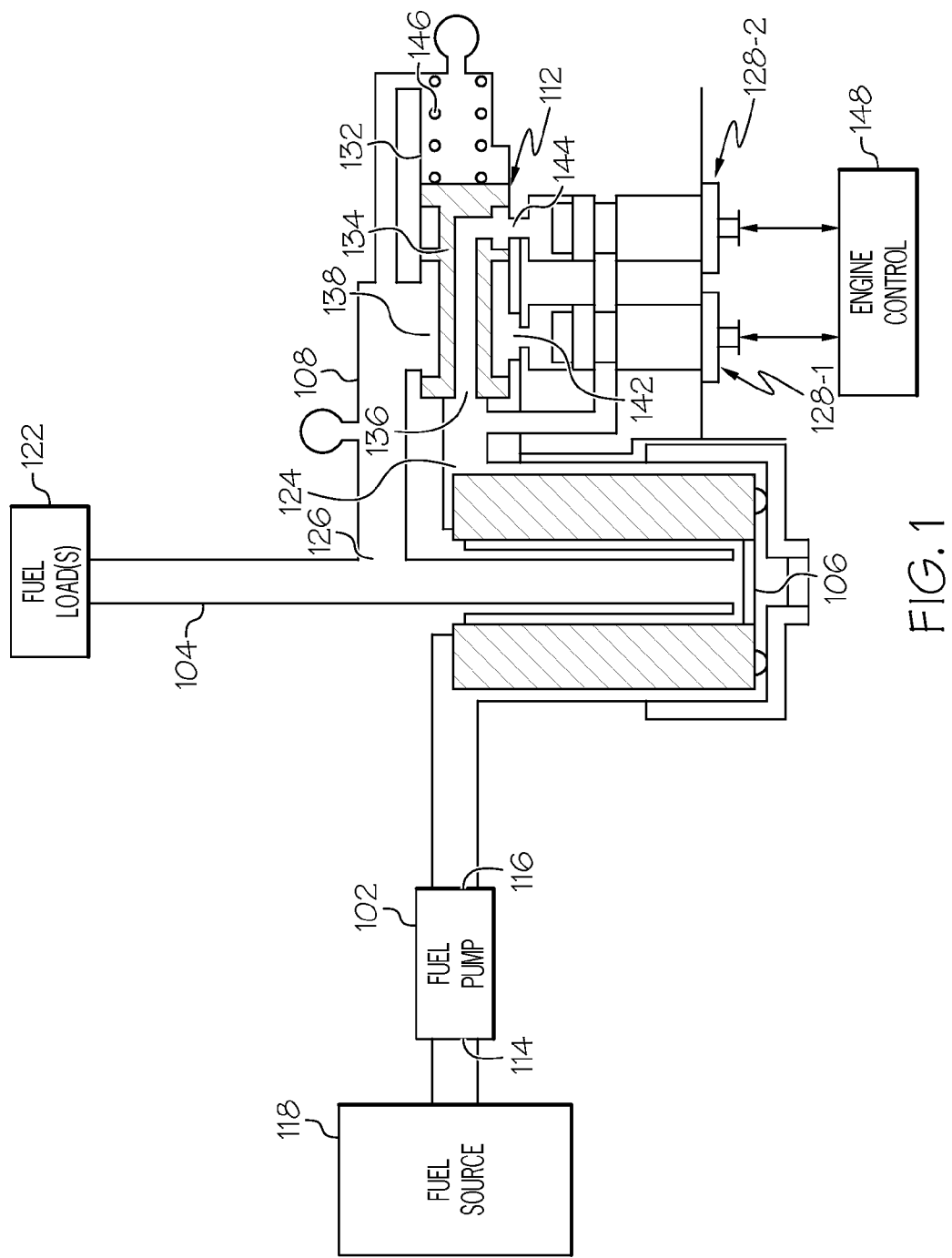
FIG. 1 depicts a schematic representation of at least a portion of an exemplary aircraft fuel supply system with a filter bypass valve in a first position.

Referring to FIG. 1, a schematic representation of at least a portion of an exemplary aircraft fuel supply system 100 is depicted. This depicted system 100 includes a fuel pump 102, a fuel supply line 104, a fuel filter 106, a filter bypass line 108, and a filter bypass valve 112. The fuel pump 102 includes at least a pump inlet 114 and a pump outlet 116. The pump inlet 114 is adapted to couple to a fuel source 118. The fuel pump 102 is adapted to receive a drive torque and is configured, upon receipt of the drive torque, to draw fuel from the fuel source 118 into the pump inlet 114 and discharge fuel from the pump outlet 116.

Before proceeding further it is noted that the fuel pump 102 may be implemented as any one of numerous pumps within an aircraft fuel supply system, and may be configured as any one of numerous types of pumps. For example, the fuel pump 102 may be implemented as a boost pump, a main fuel pump, an auxiliary fuel pump, a servo-load fuel pump, just to name a few. Moreover, the fuel pump 102 may be configured as any one of numerous types of centrifugal or positive displacement type pumps.

Regardless of the implementation and configuration of the fuel pump 102, the fuel supply line 104 is coupled to the pump outlet 116 to receive the fuel that is discharged therefrom. The fuel supply line 104 then directs the received fuel to one or more fuel loads 122. The one or more fuel loads 122 may include one or more additional downstream pumps, one or more servo-fuel loads, one or more fluid-operated actuators, and a gas turbine engine combustor fuel manifold, just to name a few.

The fuel filter 106 is disposed in series in the fuel supply line 104 and is configured to remove particulate or other debris from the fuel that is supplied to the fuel supply line 104. The fuel filter 106, at least in the depicted system 100, is disposed downstream of the fuel pump 102 and upstream of the one or more fuel loads 122. Thus, the fuel filter 106 removes particulate or other debris that may be present in the fuel before it is supplied to the one or more fuel loads 122. It will be appreciated that the specific dimensions of the particulate or other debris that the fuel filter 106 removes may vary. It will additionally be appreciated that the specific type and configuration of the fuel filter 106 may vary.

The filter bypass line 108 includes bypass line fuel inlet 124 and a bypass line fuel outlet 126. The bypass line fuel inlet 124 is coupled to the fuel supply line 104 upstream of the fuel filter 106, and the bypass line fuel outlet 126 is coupled to the fuel supply line 104 downstream of the fuel filter 106. The filter bypass line 108 is configured to selectively bypass fuel around the fuel filter 106. As will be described further below, fuel normally does not flow through the filter bypass line 108 and around the fuel filter 106. However, if the differential pressure across the filter 106 reaches a predetermined value, indicating that the fuel filter 106 is (or is near) clogged, fuel will flow through the filter bypass line 108 and around the fuel filter 106. The selective fuel flow around the fuel filter 106 is controlled by the filter bypass valve 112.

The filter bypass valve 112 is coupled to the filter bypass line 108 and is movable between a first position and a second position. Preferably, and as will be described further below, the filter bypass valve 112 moves from the first position to the second position when the differential pressure across the fuel filter 106 exceeds a predetermined differential pressure. In the first position, which is the position depicted in FIG. 1, fuel does not flow through the fuel bypass line 108. Conversely, in the second position, which is the position depicted in FIG. 2, fuel does flow through the fuel bypass line 108 and around the fuel filter 106. In addition to controlling whether or not fuel flows through the fuel bypass line 108, the filter bypass valve 112 also controls whether one or two differential pressure sensors sense the differential pressure across the fuel filter 106.

Figure 2:
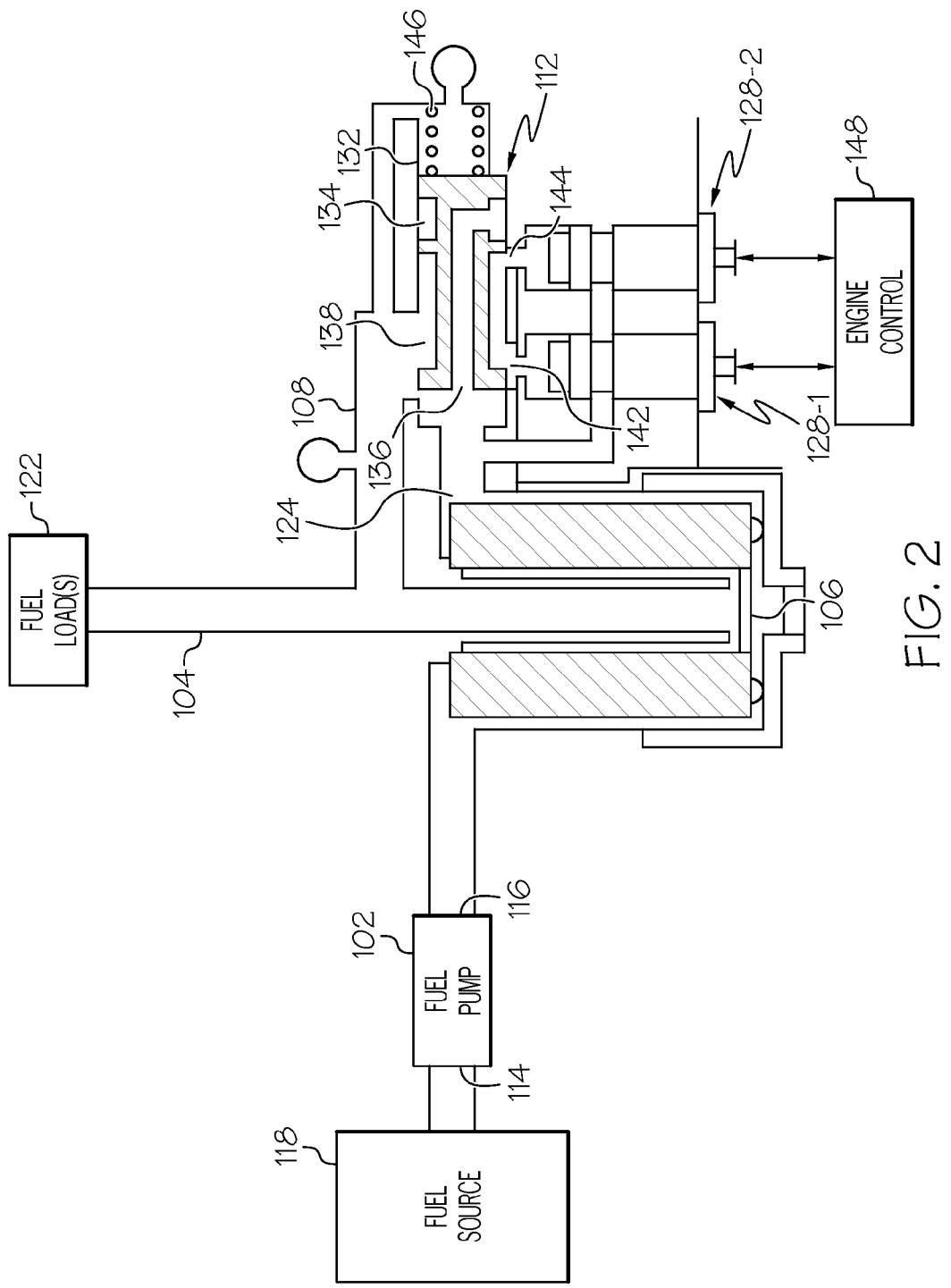
FIG. 2 depicts a schematic representation of the exemplary aircraft fuel supply system of FIG. 1 with the filter bypass valve in a second position.

In particular, and as FIGS. 1 and 2 depict, the system 100 additionally includes two differential pressure sensors 128—a first differential pressure sensor 128-1 and a second differential pressure sensor 128-2. The first differential pressure sensor 128-1 is configured to continuously sense differential pressure across the fuel filter 106, and the second differential pressure sensor 128-2 is configured, based on the position of the filter bypass valve 112, to only selectively sense differential pressure across the fuel filter 106. More specifically, and as FIG. 1 depicts, when the filter bypass valve 112 is in the first position, only the first differential pressure sensor senses differential pressure across the fuel filter. However, as FIG. 2 depicts, when the filter bypass valve 112 is in the second position, the first differential pressure sensor 128-1 and the second differential pressure sensor 128-2 both sense the differential pressure across the fuel filter 106. The first and second differential pressure sensors 128 are additionally each configured to supply a signal representative of the differential pressure sensed across the fuel filter 106.

To implement the above-described functionality, it is seen that the first differential pressure sensor 128-1 is in fluid communication with the bypass line fuel inlet 124 and the bypass line fuel outlet 126 regardless of the position of the filter bypass valve 112. That is, when the filter bypass valve 112 is in either the first position or the second position. Conversely, the second differential pressure sensor 128-2 is in fluid communication with only the bypass line fuel inlet 124 when the filter bypass valve 112 is in the first position, and is in fluid communication with the bypass line fuel inlet 124 and the bypass line fuel outlet 126 when the filter bypass valve 112 is in the second position.

The filter bypass valve 112 may be variously configured to implement its functionality, but in the depicted embodiment the filter bypass valve 112 includes a valve body 132 and a valve element 134. The valve body includes a fuel inlet 136, a fuel outlet 138, a first sensor port 142, and a second sensor port 144. The fuel inlet 136 is in fluid communication with the bypass line fuel inlet 124, and the fuel outlet 138 is in fluid communication with the bypass line fuel outlet 126. Additionally, the first sensor port 142 is in fluid communication with the first differential pressure sensor 128-1, and the second sensor port 144 is in fluid communication with the second differential pressure sensor 128-2.

The valve element 134 is movably disposed within the valve body 132 and is movable therein between the first position (FIG. 1) and the second position (FIG. 2). With reference to FIG. 1, it is seen that when the valve element 134 is in the first position, the fuel inlet 136 is in fluid communication with the second sensor port 144, and is fluidly isolated from the first sensor port 142. Moreover, the fuel outlet 138 is in fluid communication with the first sensor port 142. Thus, as described above, when the valve element 134 is in the first position, fuel does not flow through the filter bypass line 108, and only the first differential pressure sensor 128-1 senses the differential pressure across the fuel filter 106.

Now, with reference to FIG. 2, it is seen that when the valve element 134 is in the second position, the fuel inlet 136 is in fluid communication with the fuel outlet 138, and is fluidly isolated from both the first sensor port 142 and the second sensor port 144. However, the fuel outlet 138 is now in fluid communication with both the first sensor port 142 and the second sensor port 144. Thus, as described above, when the valve element 134 is in the second position, fuel does indeed flow through the filter bypass line 108, and both of the differential pressure sensors 128 sense the differential pressure across the fuel filter 106.

It was previously noted that the filter bypass valve 112 is configured to move from the first and second positions when the differential pressure across the fuel filter 106 exceeds a predetermined differential pressure. The filter bypass valve 112 may be variously configured to implement this functionality, but in the depicted embodiment it includes a bias spring 146. The bias spring 146 is disposed within the valve body 132 and supplies a bias force to the valve element 134 that biases the valve element 134 toward the first position. The bias spring 146, as may be appreciated, sets the predetermined differential pressure at which the valve element 134 moves from the first position to the second positions.

As was noted above, the first and second differential pressure sensors 128 are each configured to supply a signal representative of the differential pressure sensed across the fuel filter 106. These signals are supplied to, for example, an engine control 148 or other suitable device. It was additionally noted that the first differential pressure sensor 128-1 continuously monitors filter differential pressure, that the second differential pressure sensor 128-1 does not monitor the filter pressure differential when the filter bypass valve 112 is in the first position, and that the filter bypass valve 112 is normally in the first position. With the filter bypass valve 112 in the first position, if the first differential pressure sensor 128-1 senses that the filter differential pressure exceeds a first value, the engine control 148 (or other device) will generate an appropriate alert. This alert, which may be visual, audible, tactile, or various combinations thereof, will communicate to appropriate personnel that the fuel filter 106 may need replacement.

In the event that the filter differential pressure exceeds the predetermined value, the filter bypass valve 112 will move to the second position. In this position, both differential pressure sensors 128 sense filter differential pressure and supply signals representative thereof to the engine control 148 (or other device). In response, the engine control 148 (or other device) may generate another appropriate alert. This alert, too, may be visual, audible, tactile, or various combinations thereof, and will communicate to appropriate personnel that the fuel filter 106 is actually being bypassed.

This system described herein allows the use of a two identical differential pressure sensors 128, one that continuously senses fuel filter differential pressure, and another that senses fuel filter differential pressure only when the fuel filter 106 is being bypassed. The relatively simplistic architecture disclosed herein provides significant cost, weight, and packaging benefits as compared to presently known fuel filter monitoring architectures (reference prior art system).

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:
1. A fuel supply system, comprising:
a fuel supply line adapted to receive fuel from a fuel pump and direct the received fuel to one or more fuel loads;
a fuel filter disposed in series in the fuel supply line and configured to remove particulate from the fuel supplied to the fuel supply line;
a filter bypass line having a bypass line fuel inlet and a bypass line fuel outlet, the bypass line fuel inlet coupled to the fuel supply line upstream of the fuel filter, the bypass line fuel outlet coupled to the fuel supply line downstream of the fuel filter;
a first differential pressure sensor configured to continuously sense differential pressure across the fuel filter;
a second differential pressure sensor configured to selectively sense differential pressure across the fuel filter; and
a filter bypass valve coupled to the filter bypass line and movable between a first position, in which only the first differential pressure sensor senses differential pressure across the fuel filter, and a second position, in which the first differential pressure sensor and the second differential pressure sensor both sense differential pressure across the fuel filter, the filter bypass valve comprising:
a valve body having a fuel inlet, a fuel outlet, a first sensor port, and a second sensor port, the fuel inlet in fluid communication with the bypass line fuel inlet, the fuel outlet in fluid communication with the bypass line fuel outlet, the first sensor port in fluid communication with the first differential pressure sensor, the second sensor port in fluid communication with the second differential pressure sensor; and
a valve element disposed within the valve body and movable between the first position and the second position, wherein in the first position (i) the fuel inlet is in fluid communication with the second sensor port, (ii) the fuel inlet is fluidly isolated from the first sensor port and the fuel outlet, and (iii) the fuel outlet is in fluid communication with the first sensor port, and wherein in the in the second position (i) the fuel inlet is in fluid communication with the fuel outlet, (ii) the fuel inlet is fluidly isolated from the first sensor port and the second sensor port, and (iii) the fuel outlet is in fluid communication with the first sensor port and the second sensor port.

2. The system of claim 1, wherein the filer bypass valve moves from the first position to the second position when the differential pressure across the fuel filter exceeds a predetermined differential pressure.

3. The system of claim 1, wherein:
the first differential pressure sensor is in fluid communication with the bypass line fuel inlet and the bypass line fuel outlet when the filter bypass valve is in the first position and the second position; and the second differential pressure sensor is in fluid communication with the bypass line fuel inlet and the bypass line fuel outlet only when the filter bypass valve is in the second position.

4. The system of claim 3, wherein the second differential pressure sensor is in fluid communication with only the bypass line fuel inlet when the filter bypass valve is in the first position.

5. The system of claim 1, wherein the filter bypass valve further comprises a bias spring that biases the valve element toward the first position.

6. The system of claim 5, wherein the bias spring sets the predetermined differential pressure.

7. The system of claim 1, wherein the first and second differential pressure sensors are each configured to supply a signal representative of the differential pressure sensed across the fuel filter.

8. A fuel supply system, comprising:
   a fuel pump having at least a pump inlet and a pump outlet, the pump inlet adapted to couple to a fuel source, the fuel pump adapted to receive a drive torque and configured, upon receipt of the drive torque, to draw fuel from the fuel source into the pump inlet and discharge fuel from the pump outlet;
   a fuel supply line coupled to the pump outlet to receive fuel discharged therefrom and direct the received fuel to one or more fuel loads;
   a fuel filter disposed in series in the fuel supply line and configured to remove particulate from the fuel supplied to the fuel supply line;
   a filter bypass line having a bypass line fuel inlet and a bypass line fuel outlet, the bypass line fuel inlet coupled to the fuel supply line upstream of the fuel filter, the bypass line fuel outlet coupled to the fuel supply line downstream of the fuel filter;
   a first differential pressure sensor configured to continuously sense differential pressure across the fuel filter;
   a second differential pressure sensor configured to selectively sense differential pressure across the fuel filter; and
   a filter bypass valve coupled to the filter bypass line and movable between a first position, in which only the first differential pressure sensor senses differential pressure across the fuel filter, and a second position, in which the first differential pressure sensor and the second differential pressure sensor both sense differential pressure across the fuel filter, the filter bypass valve comprising:

a valve body having a fuel inlet, a fuel outlet, a first sensor port, and a second sensor port, the fuel inlet in fluid communication with the bypass line fuel inlet, the fuel outlet in fluid communication with the bypass line fuel outlet, the first sensor port in fluid communication with the first differential pressure sensor, the second sensor port in fluid communication with the second differential pressure sensor; and
   a valve element disposed within the valve body and movable between the first position and the second position, wherein in the first position (i) the fuel inlet is in fluid communication with the second sensor port, (ii) the fuel inlet is fluidly isolated from the first sensor port and the fuel outlet, and (iii) the fuel outlet is in fluid communication with the first sensor port, and wherein in the in the second position (i) the fuel inlet is in fluid communication with the fuel outlet, (ii) the fuel inlet is fluidly isolated from the first sensor port and the second sensor port, and (iii) the fuel outlet is in fluid communication with the first sensor port and the second sensor port.

9. The system of claim 8, wherein the filter bypass valve moves from the first position to the second position when the differential pressure across the fuel filter exceeds a predetermined differential pressure.

10. The system of claim 8, wherein:
    the first differential pressure sensor is in fluid communication with the bypass line fuel inlet and the bypass line fuel outlet when the filter bypass valve is in the first position and the second position; and
    the second differential pressure sensor is in fluid communication with the bypass line fuel inlet and the bypass line fuel outlet only when the filter bypass valve is in the second position.

11. The system of claim 10, wherein the second differential pressure sensor is in fluid communication with only the bypass line fuel inlet when the filter bypass valve is in the first position.

12. The system of claim 8, wherein the filter bypass valve further comprises a bias spring that biases the valve element toward the first position.

13. The system of claim 12, wherein the bias spring sets the predetermined differential pressure.

14. The system of claim 8, wherein the first and second differential pressure sensors are each configured to supply a signal representative of the differential pressure sensed across the fuel filter.

* * * * *